US009558291B2

(12) United States Patent
Ito et al.

(10) Patent No.: US 9,558,291 B2
(45) Date of Patent: Jan. 31, 2017

(54) IMAGE PROCESSING SYSTEM, PROCESSING METHOD, IMAGE PROCESSING APPARATUS, AND RELAY APPARATUS

(75) Inventors: Katsuaki Ito, Nagoya (JP); Satoshi Watanabe, Nagoya (JP); Yusuke Shimada, Inazawa (JP); Masafumi Miyazawa, Nagoya (JP); Takeshi Nagasaki, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 139 days.

(21) Appl. No.: 13/243,974

(22) Filed: Sep. 23, 2011

(65) Prior Publication Data

US 2012/0084402 A1    Apr. 5, 2012

(30) Foreign Application Priority Data

Sep. 30, 2010  (JP) .................................. 2010-220661
Sep. 6, 2011   (JP) .................................. 2011-193883

(51) Int. Cl.
*G06F 15/16*     (2006.01)
*G06F 17/30*     (2006.01)
(Continued)

(52) U.S. Cl.
CPC ..... *G06F 17/30899* (2013.01); *G06F 17/3089* (2013.01); *H04L 67/06* (2013.01)

(58) Field of Classification Search
CPC ........................... G06F 17/30; G06F 17/30011
(Continued)

(56) References Cited

U.S. PATENT DOCUMENTS 7,633,639 B2 * 12/2009 Ohishi ............... H04N 1/00222
                                                        358/1.13
7,835,037 B2 * 11/2010 Koide .......................... 358/474
(Continued)

FOREIGN PATENT DOCUMENTS

CN    101106631 A    1/2008
CN    101325561 A    12/2008
(Continued)

OTHER PUBLICATIONS

European Patent Office, extended European Search Report for European Patent Application No. 11182979.2, dated Mar. 8, 2012.
(Continued)

*Primary Examiner* — Azizul Choudhury
*Assistant Examiner* — Tariq Najee-Ullah
(74) *Attorney, Agent, or Firm* — Merchant & Gould P.C.

(57) ABSTRACT

An image processing system includes: a relay apparatus; a service providing apparatus for an electronic-file storing service; and an image processing apparatus, which are connected to a network. The image processing apparatus includes: a first-address-get-request transmitting unit that transmits a request for getting a first address representing a location of an electronic file to be downloaded from the service providing apparatus to the relay apparatus; a first downloading unit which, upon receiving the first address from the relay apparatus after the request for getting the first address is transmitted, downloads the electronic file stored at the first address; and a storage control unit that controls a storage unit to store the electronic file downloaded by the first downloading unit. The relay apparatus includes: a first-address-get-program storage unit; a first-address getting unit; and a first-address transmitting unit.

14 Claims, 6 Drawing Sheets

(51) Int. Cl.
*H04L 29/08* (2006.01)
*G06F 21/20* (2006.01)
*G06F 3/048* (2013.01)

(58) Field of Classification Search
USPC ........................................................ 709/219
See application file for complete search history.

(56) References Cited

U.S. PATENT DOCUMENTS

| | | | |
|---|---|---|---|
| 7,984,027 B2* | 7/2011 | Tamura | 707/694 |
| 8,107,112 B2* | 1/2012 | Ohishi | H04N 1/00222 358/1.11 |
| 8,490,084 B1 | 7/2013 | Alford et al. | 717/177 |
| 8,711,410 B2* | 4/2014 | Homma | G06F 17/30899 358/1.15 |
| 2002/0100058 A1 | 7/2002 | Hirose et al. | |
| 2003/0065585 A1 | 4/2003 | Satomi et al. | |
| 2004/0025056 A1* | 2/2004 | Katsube | G06F 17/3089 726/7 |
| 2004/0128669 A1* | 7/2004 | Furst et al. | 717/178 |
| 2004/0205115 A1* | 10/2004 | Young | H04L 29/06 709/203 |
| 2004/0239984 A1 | 12/2004 | Ishii et al. | |
| 2005/0091372 A1* | 4/2005 | Nagao | H04L 63/104 709/224 |
| 2005/0138065 A1* | 6/2005 | Ciriza | G06Q 10/10 |
| 2005/0166228 A1 | 7/2005 | Takatori et al. | |
| 2006/0277229 A1* | 12/2006 | Yoshida et al. | 707/203 |
| 2006/0294154 A1* | 12/2006 | Shimizu | 707/200 |
| 2007/0027857 A1 | 2/2007 | Deng et al. | |
| 2007/0033192 A1 | 2/2007 | Sakoh et al. | |
| 2007/0050410 A1* | 3/2007 | Sayuda | 707/104.1 |
| 2007/0083501 A1 | 4/2007 | Pedersen et al. | |
| 2007/0094258 A1 | 4/2007 | Okuzawa | |
| 2007/0118569 A1* | 5/2007 | Kishi et al. | 707/200 |
| 2007/0185885 A1* | 8/2007 | Tamura | 707/10 |
| 2007/0214185 A1* | 9/2007 | Fujiwara | 707/200 |
| 2008/0027949 A1* | 1/2008 | Kawada | 707/10 |
| 2008/0074691 A1* | 3/2008 | Kubo | 358/1.15 |
| 2008/0091836 A1* | 4/2008 | Kato | H04L 67/16 709/229 |
| 2008/0263036 A1* | 10/2008 | Yamamoto | 707/6 |
| 2008/0301262 A1 | 12/2008 | Kinoshita et al. | |
| 2009/0083304 A1* | 3/2009 | Dornbach et al. | 707/102 |
| 2009/0106305 A1* | 4/2009 | Murakami | 707/103 R |
| 2009/0198820 A1 | 8/2009 | Golla et al. | |
| 2009/0204607 A1* | 8/2009 | Matsuzawa | 707/5 |
| 2009/0290193 A1* | 11/2009 | Ohba | G06F 21/10 358/1.15 |
| 2009/0307195 A1* | 12/2009 | Anno | 707/3 |
| 2010/0046029 A1* | 2/2010 | Suzuki et al. | 358/1.15 |
| 2010/0057752 A1* | 3/2010 | Kikuchi | 707/10 |
| 2010/0118324 A1* | 5/2010 | Tagawa | H04N 1/00 358/1.13 |
| 2010/0121735 A1 | 5/2010 | Shimooka | |
| 2010/0162103 A1* | 6/2010 | Eom | G06F 3/1253 715/255 |
| 2010/0205279 A1 | 8/2010 | Takakura | |
| 2010/0223663 A1* | 9/2010 | Morimoto | G06F 21/32 726/7 |
| 2010/0245901 A1 | 9/2010 | Kitaguchi | |
| 2010/0293602 A1* | 11/2010 | Uchida | G06F 21/00 726/4 |
| 2010/0332878 A1* | 12/2010 | Ito | H04N 1/00885 713/323 |
| 2011/0051186 A1* | 3/2011 | Katsuda | H04N 1/00244 358/1.15 |
| 2011/0061099 A1 | 3/2011 | Jiang et al. | |
| 2011/0078683 A1* | 3/2011 | Yamamoto | G06F 9/4443 718/100 |
| 2012/0033259 A1* | 2/2012 | Homma | G06F 17/30899 358/1.15 |
| 2012/0081743 A1 | 4/2012 | Watanabe et al. | |
| 2012/0113463 A1 | 5/2012 | Nogawa et al. | |
| 2012/0113469 A1* | 5/2012 | Urakawa | G06F 3/122 358/1.15 |
| 2012/0113472 A1* | 5/2012 | Urakawa | H04L 67/06 358/1.15 |
| 2012/0117629 A1 | 5/2012 | Miyazawa et al. | |
| 2012/0162713 A1 | 6/2012 | Minamiyama | |

FOREIGN PATENT DOCUMENTS

| | | |
|---|---|---|
| CN | 101872309 A | 10/2010 |
| JP | 2004-355197 A | 12/2004 |
| JP | 2005-202827 A | 7/2005 |
| JP | 2005-269250 A | 9/2005 |
| JP | 2006-202028 A | 8/2006 |
| JP | 2006-260335 A | 9/2006 |
| JP | 2008-299563 A | 12/2008 |
| JP | 2010-187217 A | 8/2010 |

OTHER PUBLICATIONS

European Patent Office, extended European Search Report for European Patent Application No. 11182976.8, dated Mar. 8, 2012.
Chinese Office Action issued in CN 201110346857.5, issued Dec. 4, 2013.
Office Action issued in related U.S. Appl. No. 13/291,430, mailed Sep. 25, 2014.
Office Action issued in Chinese Patent Application No. 201110306938.2, mailed Jul. 9, 2014.
Office Action issued in related Japanese application 2011-193883, mailed Feb. 17, 2015.
Office Action issued in related U.S. Appl. No. 13/291,635, mailed Dec. 26, 2014.

* cited by examiner

IMAGE PROCESSING SYSTEM, PROCESSING METHOD, IMAGE PROCESSING APPARATUS, AND RELAY APPARATUS

CROSS-REFERENCE TO RELATED APPLICATIONS

This application claims priority from Japanese Patent Application No. 2010-220661 filed on Sep. 30, 2010 and Japanese Patent Application No. 2011-193883 filed on Sep. 6, 2011, the entire subject matter of which is incorporated herein by reference.

TECHNICAL FIELD

The invention relates to an image processing system, an image processing method, an image processing apparatus, and a relay apparatus which download an electronic file of an image from a service providing apparatus.

BACKGROUND

There has been known image reading apparatuses for uploading an electronic file of a read image to a server, print apparatuses for printing electronic files downloaded from a server, and the like. There has been proposed a related-art image reading apparatuses for uploading an electronic file of a read image to a server. In a case where a maker of image reading apparatuses or print apparatuses provides an electronic-file storing service, the maker needs to prepare a dedicated server for storing provided electronic files on maker's own.

Meanwhile, recently, electronic-file storing services capable of storing electronic files in a database on a network prepared by a service provider are in widespread use. For example, Picasa (a registered trademark) web album or flickr (a registered trademark) is an example of the electronic-file storing services. Users can use terminal devices having web browsers to upload desired electronic files to service providing apparatuses for electronic-file storing services or download desired electronic files from the service providing apparatuses for electronic-file storing services. In many electronic-file storing services, their own application program interfaces (API) are provided. A maker receiving the services can use the provided API to provide electronic-file storing services and the related services to users.

SUMMARY

Many service providers providing electronic-file storing services provide an usable API in each service. Therefore, instead of downloading desired electronic files from a dedicated server prepared by the print apparatus maker, it may be considered that a user downloads the desired electronic files from a service providing apparatus prepared by a service provider providing the electronic-file storing services and prints the desired electronic files.

In a case where a maker of an image processing apparatus for printing downloaded image data or storing downloaded image data in a storage medium provides an electronic-file storing service using a service providing apparatus prepared by a service provider, the image processing apparatus needs to have a program for using an API which the service provider provides for using the electronic-file storing service. However, the API which the service provider provides for using the electronic-file storing service may be updated for service provider's reasons. Although the API is updated for service provider's reasons, in order to maintain cooperation between the image processing apparatus and the electronic-file storing service, the maker of the image processing apparatus should update programs of the image processing apparatus owned by a user.

Also, even in a case where the image processing apparatus maker adds or erases an electronic-file storing service capable of cooperating with the image processing apparatus, it is required to upload the programs of the image processing apparatus owned by the user. Therefore, in order to maintain the cooperation between the image processing apparatus and the electronic-file storing service, the image processing apparatus maker should always perform program maintenance and management such as update of the programs of the image processing apparatus owned by the user.

Illustrative aspects of the invention is to provide an image processing system, an image processing method, and an image processing apparatus which can downloads electronic files from a service providing apparatus of a service provider providing electronic-file storing services and print the electronic files even when the image processing apparatus does not have a program using an API which the service provider provides for using the electronic-file storing services, and can suppress the operational cost of a relay apparatus relaying communication between the image processing apparatus and the service providing apparatus or the equipment investment cost for the relay apparatus.

According to one aspect of the invention, there is provided an image processing system comprising: a relay apparatus that is connected to a network, to which a service providing apparatus for an electronic-file storing service is connected; and an image processing apparatus connected to the network, wherein the image processing apparatus comprises: a first-address-get-request transmitting unit that transmits a request for getting a first address representing a location of an electronic file to be downloaded from the service providing apparatus to the relay apparatus; a first downloading unit which, upon receiving the first address from the relay apparatus after the request for getting the first address is transmitted, downloads the electronic file stored at the first address; and a storage control unit that controls a storage unit to store the electronic file downloaded by the first downloading unit, and wherein the relay apparatus comprises: a first-address-get-program storage unit that stores a first-address get program for getting the first address from the service providing apparatus, wherein the first-address get program uses an API provided in the electronic-file storing service; a first-address getting unit which, upon receiving the request for getting the first address is received from the image processing apparatus, gets the first address from the service providing apparatus by executing the first-address get program; and a first-address transmitting unit that transmits the first address got by the first-address getting unit to the image processing apparatus.

According thereto, even when the image processing apparatus does not have any program for using the API provided in the electronic-file storing service, it is possible to download electronic files from the service providing apparatus for the electronic-file storing service and to print the electronic files. Further, since the electronic files do not pass through the relay apparatus, it is possible to suppress the operational cost of the relay apparatus or the equipment investment cost for the relay apparatus. Also, according to the first aspect of the present invention, even when the API is updated for service provider's reasons, it is possible to maintain the cooperation between the image processing apparatus and the electronic-file storing service without updating programs of the image processing apparatus.

According to another aspect of the invention, there is provided an image processing method used for an image processing system, wherein the image processing system comprises a relay apparatus connected to a network, to which a service providing apparatus for an electronic-file storing service is connected, and an image processing apparatus connected to the network, wherein the image processing apparatus performs steps comprising: a first-address-get-request transmitting step that transmits a request for getting a first address representing a location of an electronic file to be downloaded from the service providing apparatus to the relay apparatus; a first downloading step which, upon receiving the first address from the relay apparatus after the request for getting the first address is transmitted, downloads the electronic file stored at the first address; and a storage control step that stores the electronic file downloaded by the first downloading unit in a storage unit, and wherein the relay apparatus performs steps comprising: a first-address-get-program storage step that stores a first-address get program for getting the first address from the service providing apparatus, wherein the first-address get program uses an API provided in the electronic-file storing service; a first-address getting step which, upon receiving the request for getting the first address is received from the image processing apparatus, gets the first address from the service providing apparatus by executing the first-address get program; and a first-address transmitting step that transmits the first address got by the first-address getting unit, to the image processing apparatus.

According to still another aspect of the invention, there is provided a relay apparatus which is connected to a network, to which a service providing apparatus for an electronic-file storing service and an image processing apparatus are connected, the relay apparatus comprising: an address-get-program storage unit that stores an address get program for getting a download address representing a location of an electronic file to be downloaded from the service providing apparatus to the image processing apparatus, wherein the address get program uses an API provided for using the electronic-file storing service; an address getting unit which, upon receiving a request for getting the download address from the image processing apparatus, gets the download address from the service providing apparatus by executing the address get program; and an address transmitting unit that transmits the download address got by the address getting unit to the image processing apparatus.

According to the aspects of the present invention, even when the image processing apparatus does not have any program for using the API provided in the electronic-file storing service, it is possible to download electronic files from the service providing apparatus for the electronic-file storing service and to print the electronic files, and since the electronic files do not pass through the relay apparatus, it is possible to suppress the operational cost of the relay apparatus or the equipment investment cost for the relay apparatus.

DETAILED DESCRIPTION

Hereinafter, exemplary embodiments of the present invention will be described with reference to the accompanying drawings. The drawings to be referred to are used for explaining technical features usable in the present invention. Configurations of devices, apparatuses, and systems, flow charts of various processes, and the like to be described below are simple explanation examples. They are not intended to limit the present invention.

<Outline of Service Cooperation System 10>

Figure 1:
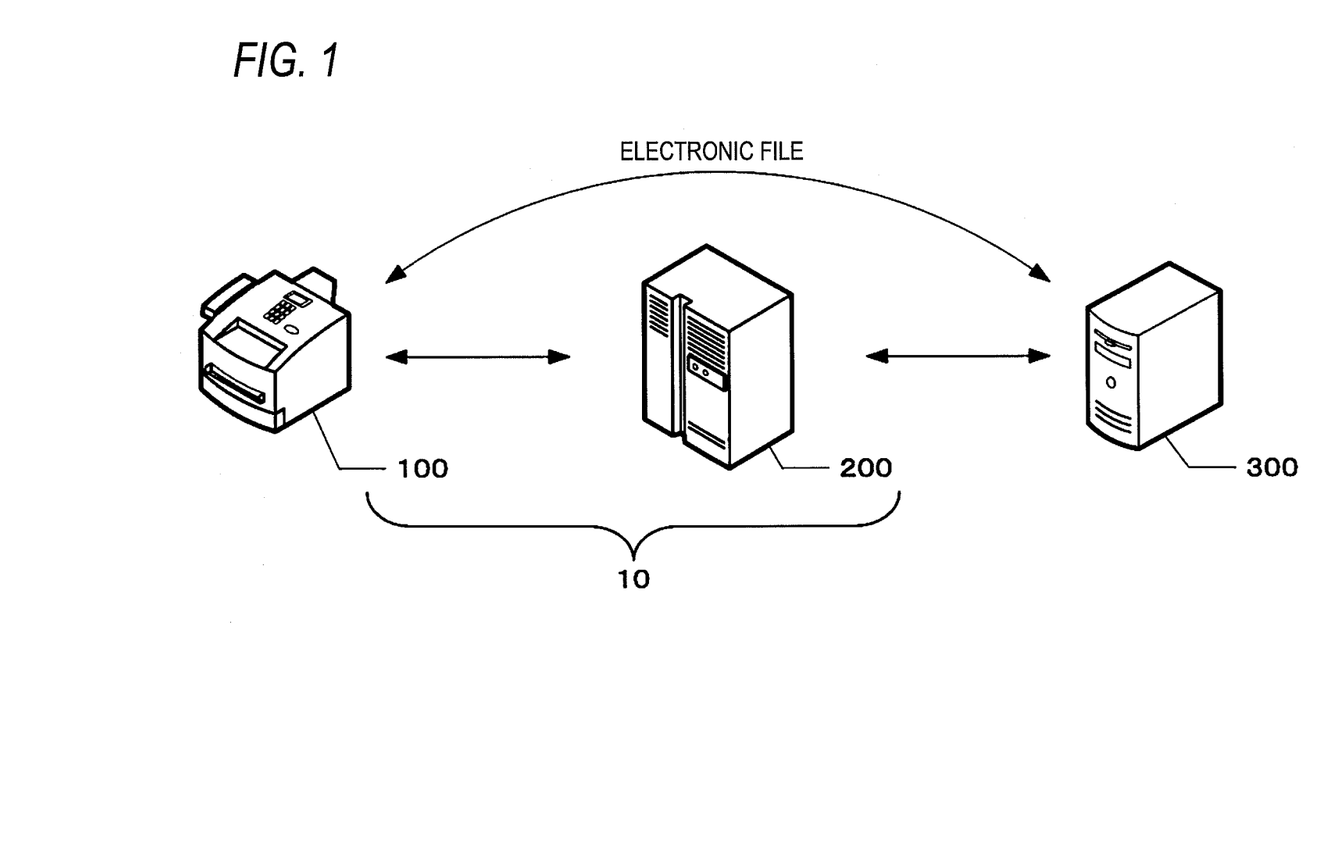
FIG. 1 is a schematic diagram illustrating an outline of a service cooperation system according to an exemplary embodiment of the present invention.

An outline of a service cooperation system 10 according to an exemplary embodiment of the present invention will be described with reference to FIG. 1. The service cooperation system 10 includes a multi-function device 100 and a relay apparatus 200. The service cooperation system 10 can perform upload or download of an electronic file in an electronic-file storing service which a service provider provides.

The electronic-file storing service is provided by a service providing apparatus 300 placed on the Internet by each service provider. Specifically, the service providing apparatus 300 is a known web server. The service providing apparatus 300 communicates with other terminals connected to the Internet on the basis of HTTP or HTTPS so as to provide a predetermined service to the terminals.

Specifically, the multi-function device 100 is a small-sized digital combined machine. The multi-function device 100 has a print function, a scanner function, a fax function, and copy function.

The multi-function device 100 can upload an electronic file of an image read by the scanner function of the multi-function device 100 to the service providing apparatus 300 for the electronic-file storing service.

Also, the multi-function device 100 can print an electronic file downloaded from the service providing apparatus 300 for the electronic-file storing service by the print function of the multi-function device 100.

The multi-function device 100 performs upload and download of electronic files in cooperation with the relay apparatus 200. The multi-function device 100 obtains URLs from the service providing apparatus 300 for the electronic-file storing service through the relay apparatus 200. The URLs includes an uploading destination URL that is an URL of a destination of upload of an electronic file to the service providing apparatus 300 for the electronic-file storing service, an electronic-file URL that is a URL of an electronic file to be downloaded from the service providing apparatus 300 for the electronic-file storing service, and the like. However, electronic files are directly transmitted to and received from the service providing apparatus 300 for the electronic-file storing service without passing through the relay apparatus 200. Therefore, in a case where the amount of data passing through the relay apparatus 200 is large, the service cooperation system 10 can suppress a load of data processing on the relay apparatus 200. Also, it is possible to suppress a load of data processing on the relay apparatus 200. Transmitted and received electronic files are binary data or text data.

The relay apparatus 200 may be a known apparatus having a server function. The relay apparatus 200 may also be a server owned by a maker of the multi-function device 100. However, it can be considered to use a known rental server or a virtual machine as represented by Amazon (a registered trademark) EC2, as the relay apparatus 200. In this case, the operational cost of the relay apparatus 200 changes according to the amount of data passing through the relay apparatus 200 and the load of processing on the relay apparatus 200. As described above, in the case where a rental server or a virtual machine is used, the operational cost of the relay apparatus 200 can be suppressed by reducing the amount of data passing through the relay apparatus 200 or reducing the load of data processing on the relay apparatus 200. Even in a case where the maker of the multi-function device 100 owns the relay apparatus 200, since the relay apparatus 200 does not need high processing performance, the equipment investment for the relay apparatus can be suppressed.

<Hardware Configuration of Service Cooperation System 10>

Figure 2:
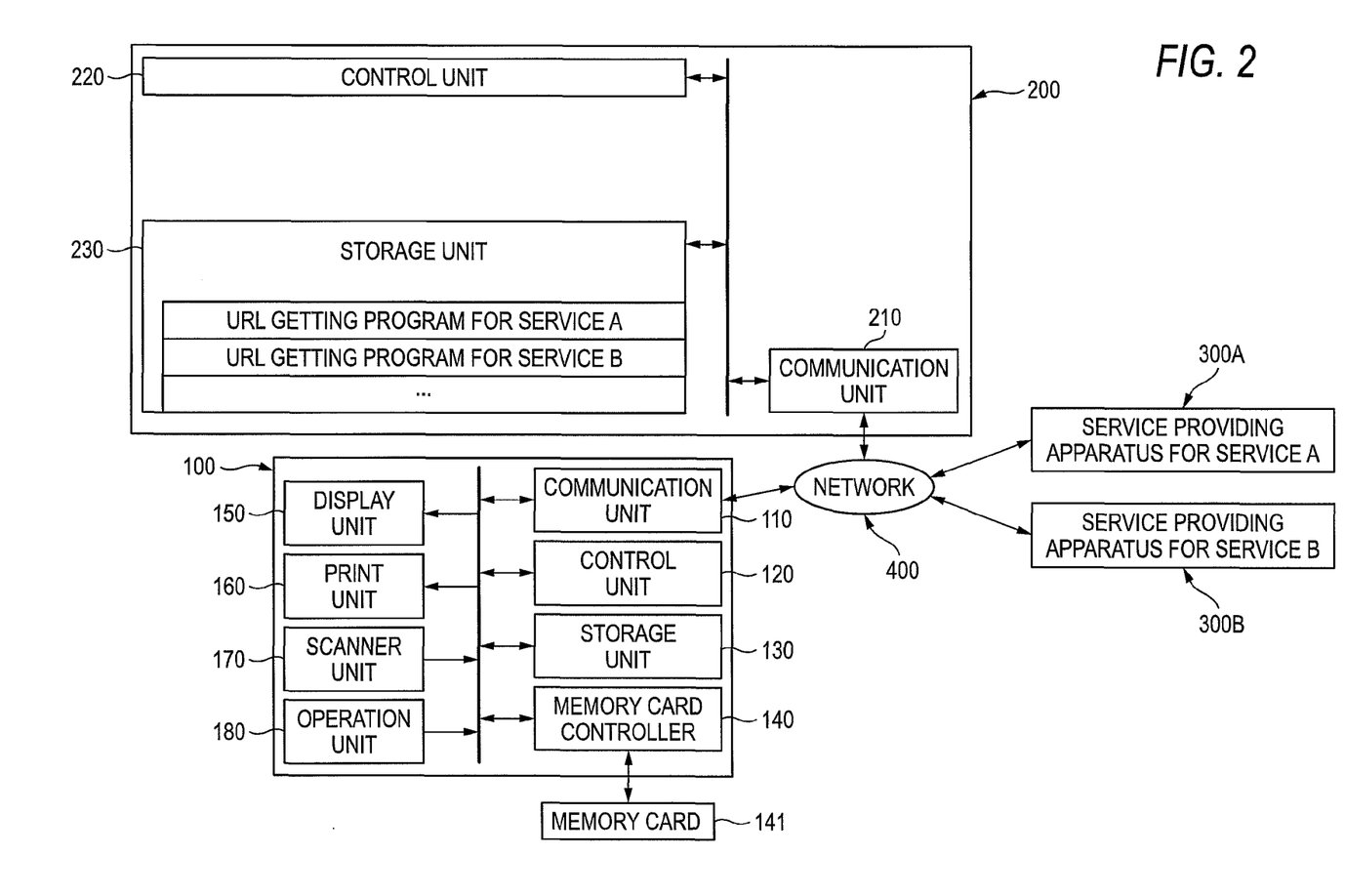
FIG. 2 is a block diagram illustrating a hardware configuration of the service cooperation system.

A hardware configuration of the service cooperation system 10 will be described with reference to FIG. 2. The following description will be made on assumption that the service cooperation system 10 performs cooperation of two electronic-file storing services, that is, a service A and a service B. In the following description, a service providing apparatus 300 for the service A is referred to as a service providing apparatus 300A. Also, a service providing apparatus 300 for the service B is referred to as a service providing apparatus 300B. In a case where it is unnecessary to particularly distinguish both sides from each other, the service providing apparatus 300A and the service providing apparatus 300B are generally referred to as the service providing apparatus 300. The multi-function device 100, the relay apparatus 200, the service providing apparatus 300A, and the service providing apparatus 300B are connected to one another through a network 400. As the network 400, for example, an Internet network can be used. The multi-function device 100, the relay apparatus 200, and the service providing apparatus 300 perform data transmission and reception with one another on the basis of HTTP.

First, a hardware configuration of the multi-function device 100 will be described. The multi-function device 100 includes a communication unit 110, a control unit 120, a storage unit 130, a memory card controller 140, a display unit 150, a print unit 160, a scanner unit 170, and an operation unit 180.

The communication unit 110 is a device for performing communication with other devices connected to the network. As the communication unit 110, a known network card can be used.

The control unit 120 includes a CPU, and a ROM and RAM connected to the CPU (not shown). The CPU controls the operation of the multi-function device 100 according to programs stored in the ROM. The programs stored in the ROM include a rendering driver for generating a screen on the basis of a text written in a markup language such as XML. The RAM is a storage device for temporarily storing various data.

The storage unit 130 is a non-volatile storage device such as a NAND-type flash memory. The storage unit 130 stores user identification information for identifying a user of the multi-function device 100, various set information, etc.

The memory card controller 140 controls the memory of a memory card 141 connected to the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic files having a predetermined format are stored.

The display unit 150 is a display device having a display such as a known LCD. The display unit 150 displays predetermined information such as a menu item selection screen (to be described below), on the basis of an instruction form the control unit 120.

The print unit 160 is a device which prints images according to an instruction of the control unit 120.

The scanner unit 170 is a device that reads images recorded on a sheet set by a user. The scanner unit 170 reads images according to an instruction of the control unit 120.

The operation unit 180 is a device that includes a plurality of operation buttons operable by the user, and transmits signals based on the pushing operation of the user to the control unit 120. The user can input a desired instruction by operating the operation unit 180.

Next, a hardware configuration of the relay apparatus 200 will be described. The description of the present exemplary embodiment will be made on assumption that the relay apparatus 200 is a physically existing server. Incidentally, the relay apparatus 200 may be a virtual machine, such as EC2, which functions as a server in cooperation with a plurality of physical devices as described above.

The relay apparatus 200 includes a communication unit 210, a control unit 220, and a storage unit 230.

The communication unit 210 is a device for performing communication with other devices connected to the network. As the communication unit 210, a known network card can be used.

The control unit 220 includes a CPU, and a ROM and RAM connected to the CPU (not shown). The CPU controls the operation of the relay apparatus 200 according to programs stored in the ROM and the storage unit 230. The RAM is a storage device for temporarily storing various data.

The storage unit 230 is a non-volatile storage device such as a hard disk drive. The storage unit 230 stores a plurality of software modules including a URL getting program for the service A and a URL getting program for the service B. Also, in order to relay communication between the multi-function device 100 and the service providing apparatus 300 in cooperation with the plurality of modules, the storage unit 230 stores a relay program shown by a flow chart of FIG. 6.

The URL getting program for the service A is a program that gets a thumbnail URL or an electronic file URL from the service providing apparatus 300A by using an API provided in the service A. The thumbnail URL is a URL indicating a location of thumbnail image which is displayed when a user selects an electronic file to be downloaded. In general, an API is a set of commands or functions written in a URL getting program that the relay apparatus 200 has. The API written in the URL getting program may be executed so as to receive services provided by a service provider. For example, the service provider has many API such as an API for requesting an album list, or an API for creating an album. A maker receiving the services can develop software using the provided APIs so as to provide services to the users in cooperation with each electronic-file storing service.

The URL getting program for the service B is a program that gets a thumbnail URL or an electronic file URL from the service providing apparatus 300B, using an API provided in the service B.

APIs for getting thumbnail URLs and electronic-file identification information are different for each service. Therefore, the relay apparatus 200 has URL getting programs for generating file list requests according to each service. Specifically, the relay apparatus 200 has the URL getting program for the service A for generating a file list request for the service A and a URL getting program for the service B for generating a file list request for the service B. The relay apparatus 200 uses the URL getting programs to generate the file list requests corresponding to each service.

The multi-function device 100 can designate a desired service of a plurality of electronic-file storing services according to the operation of the operation unit 180 by the user. Then, the multi-function device 100 can download a desired electronic file from a service providing apparatus for the designated service. Also, the multi-function device 100 can select whether to print the electronic file downloaded in the electronic-file storing service by the print unit 160 or to store the downloaded electronic file in the memory card 141 installed in the multi-function device 100, according to the operation of the operation unit 180 by the user.

<Operation of Service Cooperation System 10>

Figure 3:
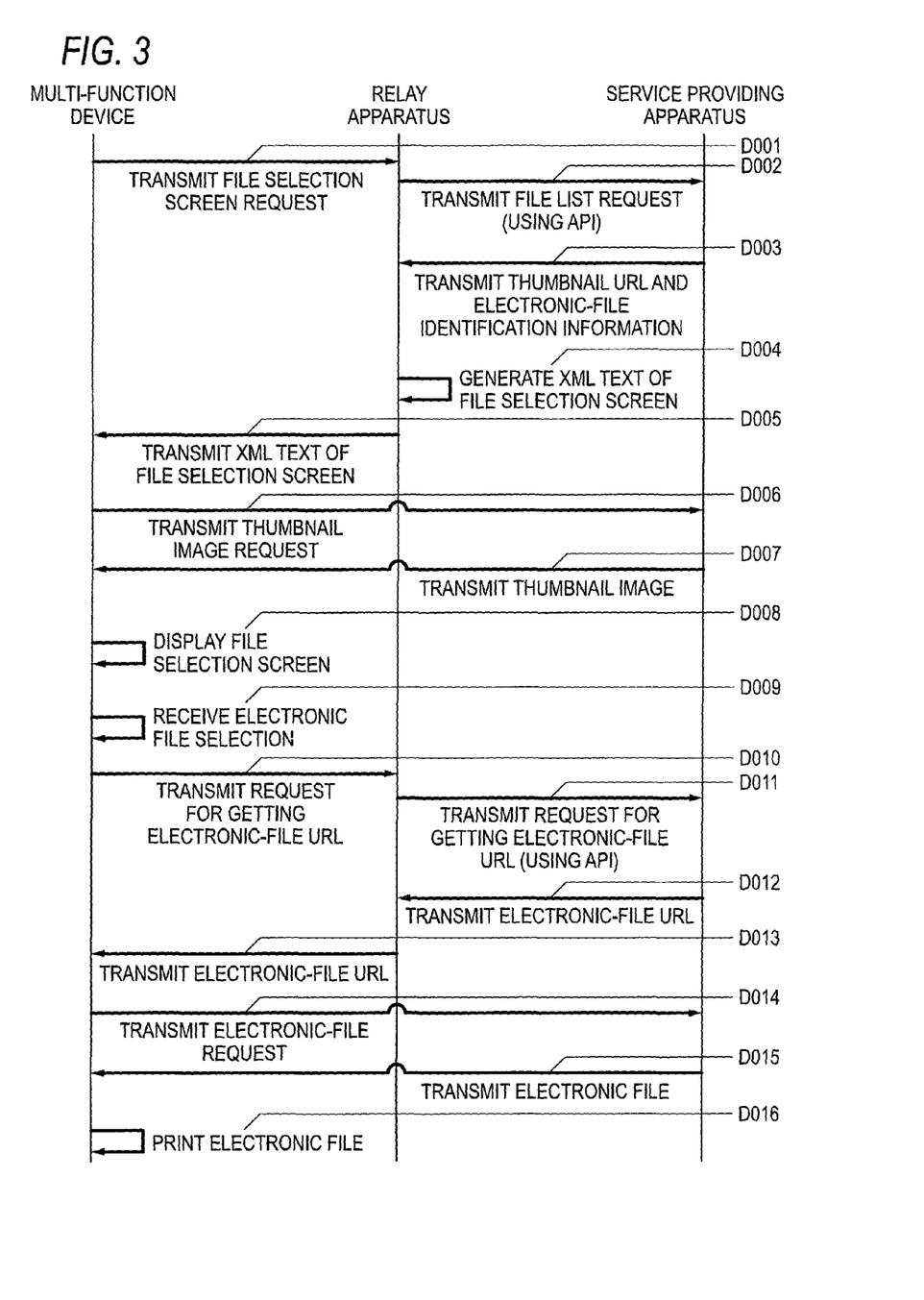
FIG. 3 is a flow chart illustrating an example of an operation of the service cooperation system.

Next, an example of the operation of the service cooperation system 10 will be described with reference to FIG. 3. FIG. 3 is a flow chart illustrating an example of the operation of the service cooperation system 10. In this example, a flow in a case where the multi-function device 100 selects printing of the electronic file downloaded from the service providing apparatus 300 for the electronic-file storing service, according to the operation of the operation unit 180 by the user will be described. In the following description, the electronic-file storing service is simply referred to as the service.

First, if the user operates the operation unit 180 of the multi-function device 100 to select a service for downloading the electronic file, in step D001, the multi-function device 100 transmits a file selection screen request to the relay apparatus 200. The file selection screen request includes service identification information that is information for identifying the service selected by the operation of the user and user identification information that is information for identifying the user.

Upon receiving the file selection screen request, in step D002, the relay apparatus 200 transmits a file list request to the service providing apparatus 300 for the service selected by the operation of the user. The file list request is a message for receiving a thumbnail URL which is a URL of a thumbnail image of an electronic file corresponding to a predetermined search condition and electronic-file identification information which is information for identifying the electronic file corresponding to the thumbnail URL, from the service providing apparatus 300. Examples of the predetermined search condition include a condition on the number of images or the type of data to be got (for example, only JPEG data) to be got from image data stored in the service providing apparatus 300, or the like. The search condition is stored in the storage unit of the relay apparatus 200 in advance.

The file list request includes search condition information which is information on the search condition. Upon receiving the file list request, in step D003, the service providing apparatus 300 searches for electronic files corresponding to the search condition information, and returns the thumbnail URLs of the electronic files and the electronic-file identification information for identifying the electronic files to the relay apparatus 200.

In step D002, the relay apparatus 200 can identify the service and the user on the basis of the service identification information and the user identification information included in the file selection screen request received from the multi-function device 100. Then, the relay apparatus 200 generates the file list request corresponding to the service and the user, and transmits the file list request to the service providing apparatus 300. The relay apparatus 200 generates the file list request according to the URL getting program written using the API for providing the service designated by the operation of the user.

Specifically, in a case where the service A is designated by the operation of the user, the relay apparatus 200 executes the URL getting program for the service A stored in the storage unit 230 so as to generate the file list request corresponding to the service A, and transmits the file list request to the service providing apparatus 300A. The generated file list request is an HTTP message included in the API provided in the service A.

The kinds of search condition information stored in generated file list requests are different for each service. For example, in a case where in order for the service providing apparatus 300 to search for a list of downloadable electronic files, an album ID is required as information for identifying the location of the electronic-file in the service, account information such as an album ID of an album used by the user or the user identification information is included in the file list request. Also, in a case where in order for the service providing apparatus 300 to search for a list of downloadable electronic files, a folder name is required as the information for identifying the location of the electronic-file in the service, the account information such as a folder name of a folder used by the user or the user identification information is included in the file list request.

Also, additional information other than the search condition information may be stored in the file list request. For example, in a case where the service providing apparatus 300 for the service requires authentication information on the user to authenticate the user, the authentication information is stored in the file list request.

The search condition information or the additional information such as the authentication information is stored in the storage unit 230 in advance. The relay apparatus 200 generates the file list request, to which necessary additional information is added, according to each service.

Upon receiving the file list request, the service providing apparatus 300 transmits the thumbnail URL and the electronic-file identification information corresponding to the file list request, to the relay apparatus 200 in step D003. In a case where there are a plurality of electronic files corresponding to the received file list request, the service providing apparatus 300 transmits a plurality of thumbnail URLs and electronic-file identification information corresponding to the plurality of electronic files, to the relay apparatus 200.

Upon receiving the thumbnail URL and the electronic-file identification information from the service providing apparatus 300, in step D004, the relay apparatus 200 generates an XML text for a file selection screen to be displayed on the multi-function device 100, on the basis of the received thumbnail URL and electronic-file identification information. The file selection screen is a screen for enabling the user to select an electronic file to be downloaded at the multi-function device 100.

In step D005, the relay apparatus 200 transmits a message including the XML text of the file selection screen generated in step D004, to the multi-function device 100. If receiving the XML text of the file selection screen, the multi-function device 100 performs rendering according to the XML text. The received XML text includes a request for an electronic-file URL which is written therein and includes electronic-file identification information in a case where a thumbnail image corresponding to the electronic-file identification information is selected by operation of the user. The request for getting the electronic-file URL written in the XML text is used for communication of step D010, which will be described later. In step D006, on the basis of the thumbnail URL included in the XML text, the multi-function device 100 transmits a thumbnail image request to the service providing apparatus 300. Specifically, the thumbnail image request is an HTTP message using a GET method. The thumbnail image request includes a thumbnail URL got from the relay apparatus 200. A server performing communication based on HTTP should support the general GET method. Even if programs for performing the thumbnail image request according to each service are not generated, the multi-function device 100 performs the thumbnail image request using the GET method generally used for downloading thumbnail images, such that it is possible to download a thumbnail image from a service providing apparatus for each service. When the multi-function device 100 has got a plurality of thumbnail URLs from the relay apparatus 200, the multi-function device 100 transmits the thumbnail image request to each of the got thumbnail URLs of the service providing apparatus 300.

Upon receiving the thumbnail image request, the service providing apparatus 300 transmits the thumbnail images stored in the URL included in the received thumbnail image request, to the multi-function device 100 in step D007.

Upon receiving the thumbnail images from the service providing apparatus 300, the multi-function device 100 displays the electronic-file selection screen on the display unit 150 in step D008. The thumbnail images received from the service providing apparatus 300 are arranged on the electronic-file selection screen. Therefore, the user can look for a desired electronic file while browsing the thumbnail images.

After displaying the electronic-file selection screen, the multi-function device 100 receives a selection of an electronic file from the user in step D009. The user may select the desired electronic file by operating the operation unit 180.

When the desired electronic file is selected by the operation of the user, the multi-function device 100 transmits the request for getting the electronic-file URL to the relay apparatus 200 in step D010. The request for getting the electronic-file URL includes the user identification information for identifying the user of the multi-function device 100, the service identification information for identifying the service selected by the operation of the user, and the electronic-file identification information on the electronic file selected by the operation of the user.

Upon receiving the request for getting the electronic-file URL, in step D011, the relay apparatus 200 transmits an electronic-file URL request to the service providing apparatus 300 for the service selected by the operation of the user. The electronic-file URL request includes the electronic-file identification information received from the multi-function device 100. The relay apparatus 200 can identify the service to be used for transmission of the request for getting the electronic-file URL, on the basis of the service identification information included in the received request for getting the electronic-file URL. Then, the relay apparatus 200 generates the electronic-file URL request corresponding to the service, and transmits the electronic-file URL request to the service providing apparatus 300. In this case, the relay apparatus 200 generates the electronic-file URL request according the URL getting program according to the service designated by the operation of the user.

Specifically, in a case where the service A is designated by the operation of the user, the relay apparatus 200 generates the electronic-file URL request corresponding to the service A, in accordance with the URL getting program for the service A stored in the storage unit 230, and transmits the electronic-file URL request to the service providing apparatus 300A. Similarly to the file list request, the generated electronic-file URL request is an HTTP message using the API provided in the service A. APIs for getting electronic-file URLs are different for each service. For this reason, the relay apparatus 200 has URL getting programs for generating electronic-file URL requests according to each service. Specifically, the relay apparatus 200 has the URL getting program for the service A for generating the electronic-file URL request for the service A, and the URL getting program for the service B for generating the electronic-file URL request for the service B. The relay apparatus 200 executes the URL getting programs so as to generate the electronic-file URL requests corresponding to each service.

Similarly to the file list request, in a case where some additional information is required for the generated electronic-file URL request, the relay apparatus 200 generates the electronic-file URL request, to which the additional information stored in the storage unit 230 in advance is added.

Upon receiving the electronic-file URL request, in step D012, the service providing apparatus 300 transmits the URL of the electronic file corresponding to the electronic-file URL request, as an electronic-file URL to the relay apparatus 200.

Upon receiving the electronic-file URL from the service providing apparatus 300, the relay apparatus 200 transmits the received electronic-file URL to the multi-function device 100 in step D013.

Upon getting the electronic-file URL, the multi-function device 100 transmits an electronic file request to the service providing apparatus 300 in step D014. Incidentally, the electronic file request is an HTTP message using the GET method. The electronic file request includes the electronic-file URL got from the relay apparatus 200. Similarly to the thumbnail image request, even if a program for performing the electronic file request according to each service is not generated, the multi-function device 100 can download the desired electronic file by transmitting the HTTP message using the GET method.

Upon receiving the electronic file request, the service providing apparatus 300 transmits the electronic file stored at the URL included in the electronic file request, to the multi-function device 100 in step D015.

Upon receiving the electronic file from the service providing apparatus 300, the multi-function device 100 prints the received electronic file in step D016. In this way, the user can download the desired electronic file from the service providing apparatus 300 for the electronic-file storing service, and print the downloaded electronic file.

<Operation of Multi-Function Device 100>

Figure 4:
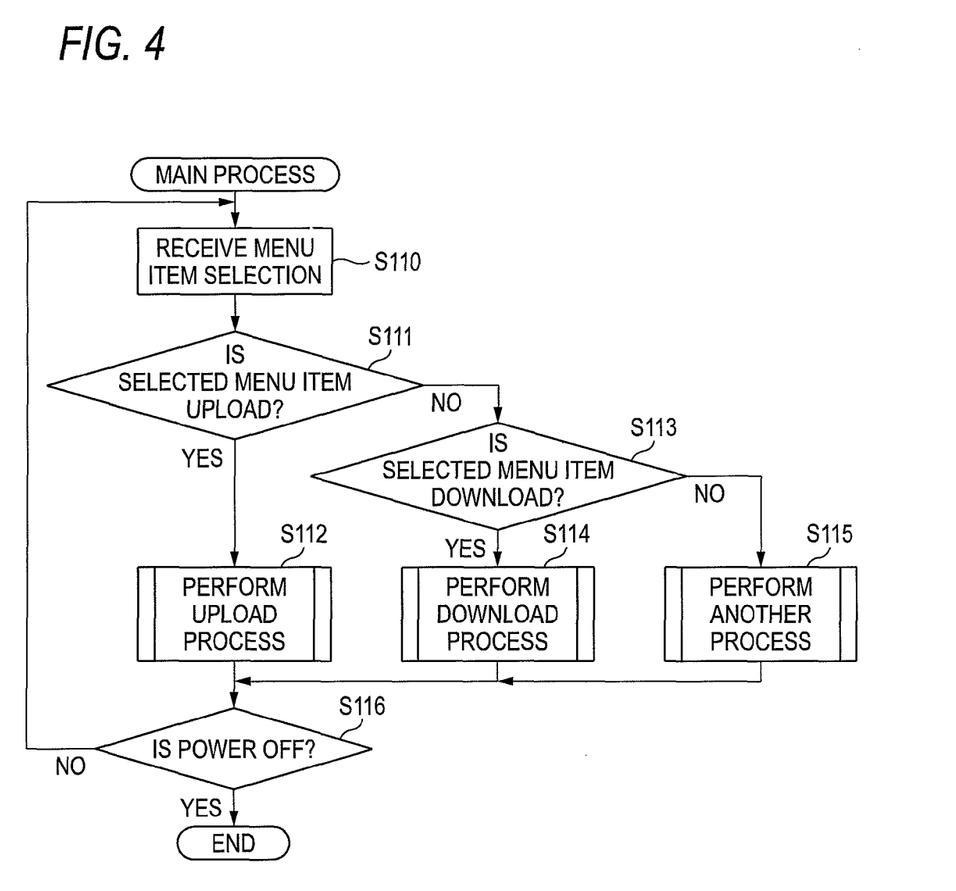
FIG. 4 is a flow chart illustrating a main process of a multi-function device.
Figure 5:
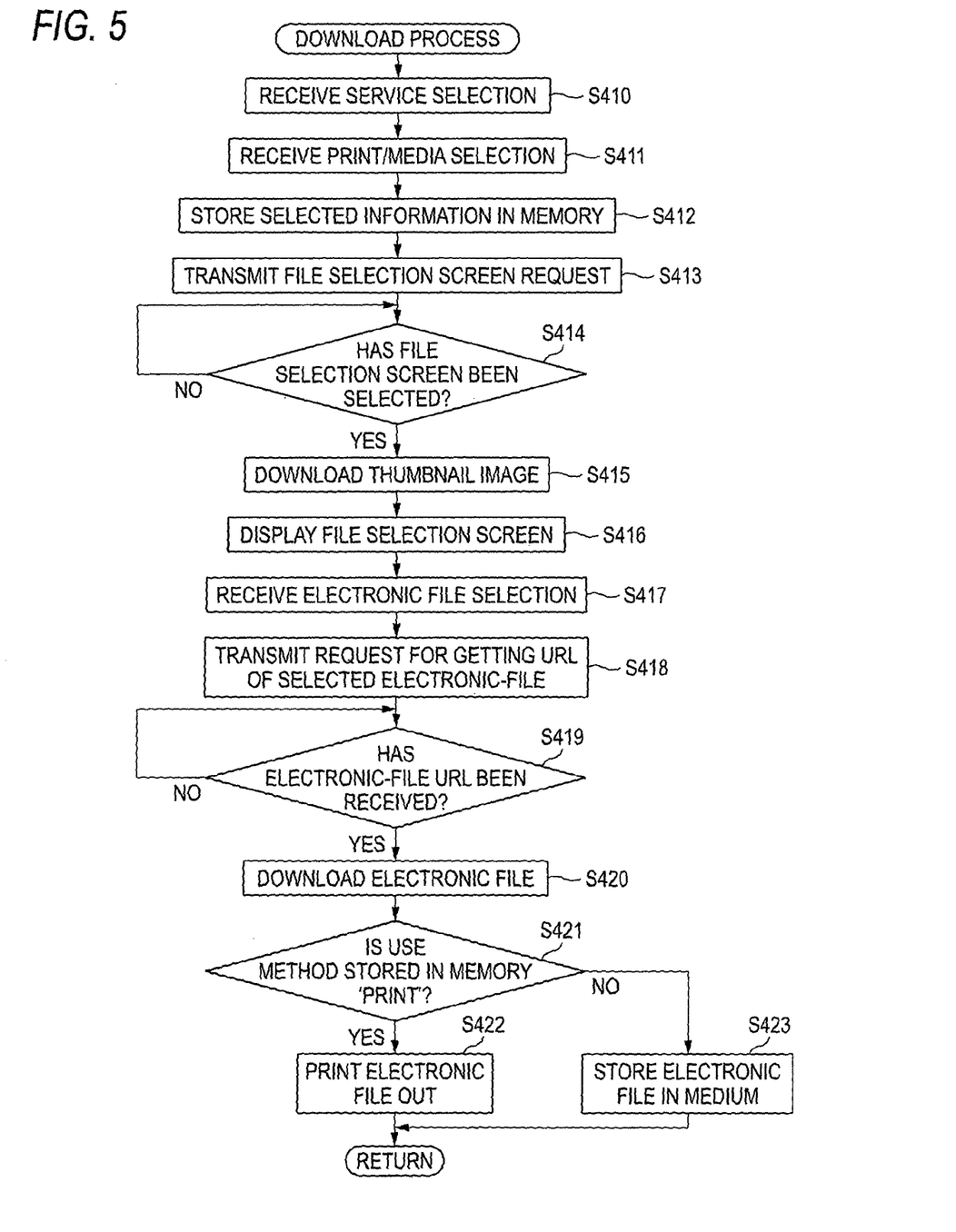
FIG. 5 is a flow chart illustrating a download process of the main process.

Next, a detailed operation of the multi-function device 100 will be described with reference to FIGS. 4 and 5. If power of the multi-function device 100 is turned on, the control unit 120 of the multi-function device 100 starts a main process shown in FIG. 4 in accordance with a predetermined program stored in the ROM.

First, in step S110, the control unit 120 displays a menu item selection screen on the display unit 150, and receives a menu item selection from the user. A plurality of menu items are displayed on the menu item selection screen. The user can select a desired menu item by operating the operation unit 180. The plurality of menu items includes at least menu items of 'UPLOAD' and 'DOWNLOAD'.

The menu item 'UPLOAD' is a menu item that is selected for uploading a desired electronic file to the service providing apparatus 300 for the electronic-file storing service. The menu item 'DOWNLOAD' is a menu item that is selected for downloading a desired electronic file from the service providing apparatus 300 for the electronic-file storing service.

After receiving the menu item selection from the user, in step S111, the control unit 120 determines whether the selected menu item is 'UPLOAD' or not.

In a case where the selected menu item is 'UPLOAD' (Yes in step S111), in step S112, the control unit 120 performs an upload process. The upload process is a process for uploading an electronic file of an image read by the scanner unit 170, to the service providing apparatus 300 for the service selected by the user.

In a case where the selected menu item is not 'UPLOAD' (No in step S111), in step S113, the control unit 120 determines whether the selected menu item is 'DOWNLOAD' or not.

In a case where the selected menu item is 'DOWNLOAD' (Yes in step S113), in step S114, the control unit 120 performs a download process, which will be described later. The download process is a process for downloading an electronic file from the service providing apparatus 300 for the service selected by the user.

In a case where the selected menu item is not 'DOWNLOAD' (No in step S113), in step 115, the control unit 120 performs another process according to the menu item selection.

After performs any one of steps S112, S114, and S115, in step S116, the control unit 120 determines whether the user has performed operation for turning off, or not. In a case where the user has not performed the operation for turning off the power (No in step S116), the control unit 120 returns to the step S110 and repeats the processes of steps S110 to S115. In a case where the user has performed the operation for turning off (Yes in step S116), the control unit 120 turns off the power of the multi-function device 100 and ends the main process.

Next, the download process will be described in detail with reference to FIG. 5. When the download process starts, in step S410, the control unit 120 displays a service selection screen on the display unit 150, and receives a selection of a desire service from the user. In the present exemplary embodiment, the desired service is selected from the service A and service B by operation of the user. When the user selects any service by operation, the control unit 120 stores the service identification information for identifying the service selected by the operation of the user, in the RAM.

After receiving the service selection, in step S411, the control unit 120 displays the print/media selection screen on the display unit 150 to enable the user to select a use method of an electronic file to be downloaded. On the print/media selection screen, items 'PRINT' and 'MEDIA' are displayed as selection items of the use method of the electronic file to be downloaded in this service. The item 'PRINT' is an item for printing the electronic file to be downloaded by the print unit 160. The item 'MEDIA' is an item for storing the electronic file to be downloaded.

After displaying the print/media selection screen, in step S411, the control unit 120 receives a selection of the use method from the user. The user can select the use method by operating the operation unit 180.

Upon receiving the selection of the use method from the user, in step S412, the control unit 120 stores the use method, selected in step S411 by the operation of the user, in the RAM.

After storing the use method in the RAM, the control unit 120 transmits the file selection screen request to the relay apparatus 200 in step S413. As described above, the file selection screen request includes the service identification information and the user identification information. As this service identification information, the service identification information stored in the RAM in step S410 may be used. The storage unit 130 stores the user identification information for identifying the user of the multi-function device 100 in advance. As the user identification information of the file selection screen request, the user identification information stored in the storage unit 130 may be used. In a case where a plurality of users share one multi-function device 100, after a user selects the menu item 'DOWNLOAD' by operation, the control unit 120 may perform a login process for the user by a known method so as to identify the user identification information on the user who is operating the multi-function device 100.

After transmitting the file selection screen request, in step S414, the control unit 120 determines whether the XML text of the file selection screen has been received from the relay apparatus 200.

In a case where the XML text of the file selection screen has not been received from the relay apparatus 200 (No in step S414), the control unit 120 stands by until the XML text of the file selection screen is received from the relay apparatus 200.

In a case where the XML text of the file selection screen has been received from the relay apparatus 200 (Yes in step S414), the control unit 120 performs the rendering on the basis of the XML text of the file selection screen. In step S415, on the basis of the thumbnail URL included in the XML text, the control unit 120 downloads the thumbnail image from the service providing apparatus 300. Specifically, as described with respect to steps D006 and D007, the control unit 120 transmits the thumbnail image request to the service providing apparatus 300, and receives the thumbnail image from the service providing apparatus 300. That is, the control unit 120 is configured to: receive the thumbnail URL from the relay apparatus 300 after transmitting the request for getting the thumbnail URL to the service providing apparatus 300; transmit the thumbnail image request including the received thumbnail URL to the service providing apparatus 300; and receive the thumbnail image transmitted from the service providing apparatus 300 in response to the transmitted thumbnail image request.

After downloading the thumbnail image, in step S416, the control unit 120 displays the file selection screen on the display unit 150.

After displaying the file selection screen, in step S417, the control unit 120 receives a selection of an electronic file to be downloaded, from the user.

When the user selects an electronic file to be downloaded, in step S418, the control unit 120 transmits the request for getting the electronic-file URL to the relay apparatus 200. The transmitted request for getting the electronic-file URL includes the electronic-file identification information for identifying the electronic file selected by the user.

After transmitting the request for getting the electronic-file URL, in step S419, the control unit 120 determines whether the electronic-file URL has been received from the relay apparatus 200.

In a case where the electronic-file URL has not been received from the relay apparatus 200 (No in step S419), the control unit 120 stands by until the electronic-file URL is received from the relay apparatus 200.

In a case where the electronic-file URL has been received form the relay apparatus 200 (Yes in step S419), in step S420, the control unit 120 downloads the electronic file from the service providing apparatus 300 on the basis of the received electronic-file URL. Specifically, as described with respect to steps D014 and D015, the control unit 120 transmits the electronic-file request to the service providing apparatus 300, and receives the electronic file from the service providing apparatus 300. The control unit 120 stores the electronic file received from the service providing apparatus 300 in the storage unit. That is, the control unit 120 is configured to: receive the electronic-file URL from the relay apparatus 200 after transmitting the request for getting the electronic-file URL to the relay apparatus 200; transmit the electronic-file request including the received electronic-file URL to the service providing apparatus 300; and receive an electronic file transmitted from the service providing apparatus 300 in response to the transmitted electronic file request.

After downloading the electronic file, in step S421, the control unit 120 determines the use method stored in the RAM in step S412 is 'PRINT' or not.

In a case where the use method selected by the user is 'PRINT' (Yes in step S421), in the control unit 120 prints the downloaded electronic file at the print unit 160 in step S422, and returns to the main process.

In a case where the use method selected by the user is 'MEDIA' (No in step S421), the control unit 120 stores the downloaded electronic file in a predetermined area of the memory card 141 in step S423, and returns to the main process.

<Operation of Relay Apparatus 200>

Figure 6:
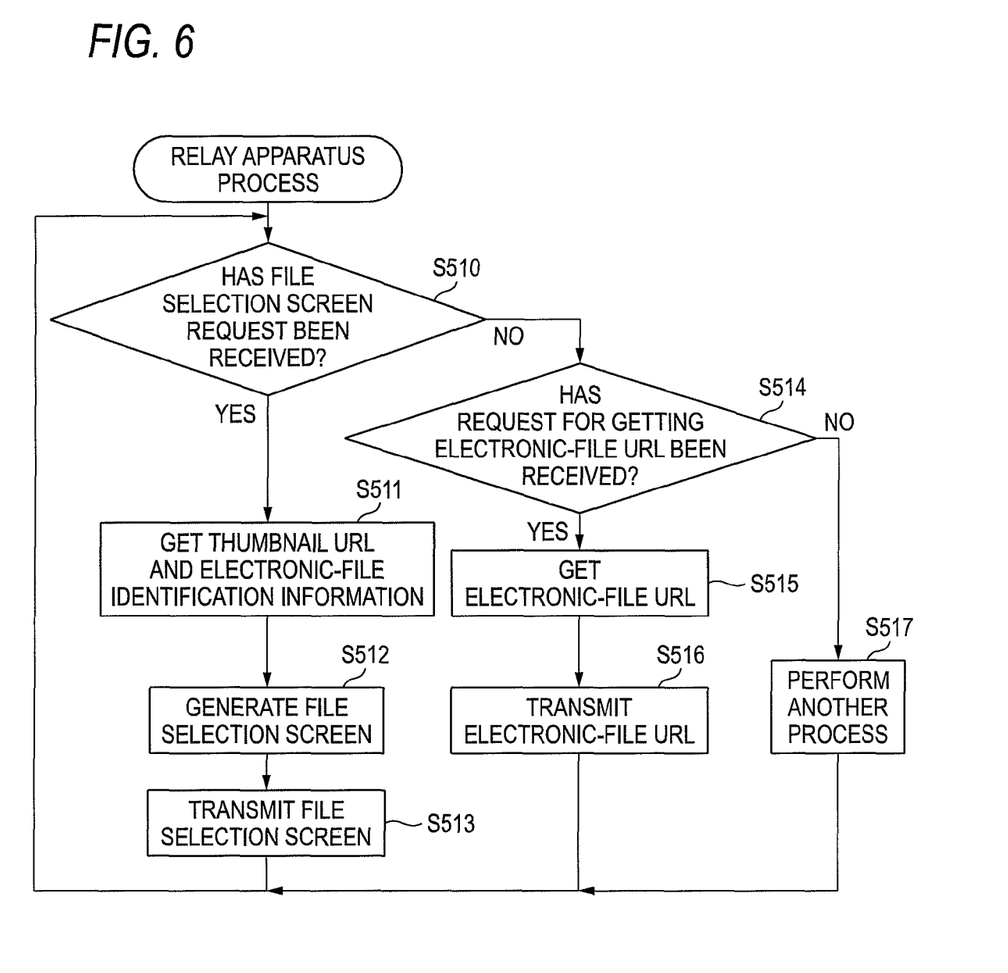
FIG. 6 is a flow chart illustrating a relay apparatus process of a relay apparatus.

Next, a detailed operation of the relay apparatus 200 will be described with reference to FIG. 6. When the relay program stored in the storage unit 230 starts to be executed, the control unit 220 of the relay apparatus 200 starts a relay apparatus process shown in FIG. 6 in accordance with the relay program.

When the relay apparatus process starts, first, in step S510, the control unit 220 determines whether the file selection screen request has been received from the multi-function device 100.

In a case where the control unit 220 determines that the file selection screen request has been received (Yes in step S510), in step S511, the control unit 220 gets the thumbnail URL and the electronic-file identification information from the service providing apparatus 300. Specifically, as described with respect to step D002, the control unit 220 executes the URL getting program corresponding to the service identification information included in the received file selection screen request so as to transmit the file list request to the service providing apparatus 300, thereby getting the thumbnail URL and the electronic-file identification information.

After getting the thumbnail URL and the electronic-file identification information, in step S512, the control unit 220 generates the XML text of the file selection screen. The XML text of the file selection screen is generated as described with respect to step D004.

Next, the control unit 220 transmits the XML text of the file selection screen to the multi-function device 100 in step S513, and returns to step S510.

In a case where the control unit 220 determines in step S510 that the file selection screen request has not been received (No in step S510), in step S514, the control unit 220 determines whether the request for getting the electronic-file URL has been received from the multi-function device 100.

In a case where it is determined that the request for getting the electronic-file URL has been received from the multi-function device 100 (Yes in step S514), in step S515, the control unit 220 gets the electronic-file URL from the service providing apparatus 300. Specifically, as described with respect to step D011, the control unit 120 executes the URL getting program corresponding to the service identification information included in the received request for getting the electronic-file URL so as to transmit the electronic-file URL request to the service providing apparatus 300, thereby getting the electronic-file URL.

After getting the electronic-file URL, the control unit 220 transmits the got electronic-file URL to the multi-function device 100 in step S516, and returns to step S510.

In a case where the control unit 220 determines in step S514 that the electronic-file URL has not been received (No in step S514), the control unit 120 performs another process in step S517, and returns to step S510. When the multi-function device 100 uploads a desired image from the service providing apparatus 300, the relay apparatus 200 may perform a process for relaying the communication between the multi-function device 100 and the service providing apparatus 300 as a specific example of another process.

As described above, the service cooperation system 10 can print the electronic file downloaded in the desired service. Further, since the electronic file does not pass through the relay apparatus 200, it is possible to suppress the operational cost of the relay apparatus 200.

The relay apparatus 200 can be connected with a plurality of multi-function devices 100 to make the plurality of multi-function devices 100 and the service providing apparatus 300 cooperate with each other. The maker providing the service cooperation system to the users can maintain the cooperation between the plurality of multi-function devices 100 and the service providing apparatus 300 for the electronic-file storing service only by updating the URL getting program of the relay apparatus 200, if necessary.

The service providing apparatus 300 is one example of a service providing apparatus of the invention. The relay apparatus 200 is one example of a relay apparatus of the invention. The print unit 160 is one example of a print unit of the invention. The multi-function device 100 is one example of an image processing apparatus of the invention. The service cooperation system 10 is one example of an image processing system of the invention. The storage unit 130 is one example of a storage unit of the invention. The control unit 120 that performs step S418 in the exemplary embodiments is one example of a first-address-get-request transmitting unit of the invention. The control unit 120 that performs step S420 in the exemplary embodiments is one example of a first downloading unit, a first-address receiving unit, an electronic-file-request transmitting unit, and an electronic-file receiving unit of the invention. The control unit 120 that performs S420 and S423 is one example of a storage control unit. The control unit 120 that performs step S422 in the exemplary embodiments is one example of a print control unit of the invention. The storage unit 230 is one example of a first-address-get-program storage unit of the invention. The control unit 220 that performs step S515 in the exemplary embodiments is one example fo a first-address getting unit of the invention. The control unit 220 that performs step S516 in the exemplary embodiments is one example of a first-address transmitting unit of the invention. The display unit 150 is one example of a display unit of the invention. The control unit 120 that performs step S413 in the exemplary embodiments is one example of a second-address-get-request transmitting unit of the invention. The control unit 120 that performs step S415 in the exemplary embodiments is one example of a second downloading unit, a second-address receiving unit, a thumbnail-image-request transmitting unit, and a thumbnail-image receiving unit of the invention. The control unit 120 that performs step S416 in the exemplary embodiments is one example of a display control unit of the invention. The storage unit 230 in the exemplary embodiments is one example of a second-address-get-program storage unit of the invention. The control unit 220 that performs step S511 in the exemplary embodiments is one example of a second-address getting unit of the invention. The control unit 220 that performs step S513 in the exemplary embodiments is one example of a second-address transmitting unit of the invention.

It is apparent that the invention is not limited to the above-described exemplary embodiments, but may be variously modified without departing from the scope of the invention.

In the above-described exemplary embodiments, in the relay apparatus process, the control unit 220 of the relay apparatus 200 generates the XML text of the file selection screen in step S512, and transmits the XML text of the file selection screen in step S513. However, the present invention is not limited thereto. For example, the relay apparatus 200 may transmit the entire electronic-file identification information and thumbnail URL received in each service to the multi-function device 100. The multi-function device 100 may generating a file selection screen on the basis of the received electronic-file identification information and thumbnail URL in accordance with a predetermined program prepared on maker's own by the maker.

In the above-described exemplary embodiments, in step S511 of the relay apparatus process, the relay apparatus 200 gets the thumbnail URL. However, the present invention is not limited thereto. For example, the relay apparatus 200 may get the file name of the electronic file instead of the thumbnail URL, and the multi-function device 100 may display the file name by switching to the thumbnail image.

In the above description, the additional information necessary for the file list request is stored in the relay apparatus 200 in advance. However, the present invention is not limited thereto. For example, before generating the file list request, the relay apparatus 200 may inquire about the necessary additional information from the multi-function device 100. The multi-function device 100 receiving the inquiry about the additional information may display an additional information inquiry screen on the display unit 150, and the user may perform additional information input or selection. That is, the user can designate an album ID of a desired album or a folder name of a desired album. Then, the multi-function device 100 may transmit the additional information input or selected by the user, to the relay apparatus 200. In this way, the relay apparatus 200 can specify the necessary additional information. The relay apparatus 200 may transmit a message of the inquiry screen generated in the markup language such as XML, to the multi-function device 100. The multi-function device 100 may perform rendering on the basis of the received message, thereby capable of displaying the inquiry screen corresponding to the service designated by the operation of the user. The multi-function device 100 may further include a rendering driver written in markup languages such as XML, so as to be able to display inquiry screens according to each service. The inquiry screens corresponding to each service may be different for each kind of additional information input or selected by the user. Therefore, the user can freely designate a desired album or folder for downloading a thumbnail image according to each service.

What is claimed is:

1. An image processing system comprising:
   a relay apparatus that is connected to a network, to which a service providing apparatus for an electronic-file storing service is connected; and
   an image processing apparatus connected to the network, wherein the image processing apparatus comprises:
      a display unit configured to display information;
      an operation unit that is operated by a user; and
      a first central processing unit executable with program instructions which, when executed, cause the first central processing unit to:
         transmit, to the relay apparatus, a request for getting a first address representing a location of an electronic file to be downloaded from the service providing apparatus, the request for getting the first address including service identification information;
         upon receiving the first address from the relay apparatus after the request for getting the first address is transmitted to the relay apparatus, download the electronic file stored at the first address from the service providing apparatus without the electronic file being relayed by the relay apparatus;
         control a storage unit to store the electronic file;
         transmit, to the relay apparatus, a request for getting a second address representing a location where information for specifying at least one electronic file is stored cc, the request for getting a second address including service identification information;
         upon receiving the second address from the relay apparatus after the second-address-get-request is transmitted to the relay apparatus, download the location information stored at the second address from the service providing apparatus without the location information stored at the second address being relayed by the relay apparatus;
         display a selection screen which displays the location information so as to enable the user to select the at least one electronic file to be downloaded on the display unit; and
         transmit, to the relay apparatus, the request for getting the first address of the electronic file selected by operating the operation unit by the user while the selection screen is displayed by the display control unit, and
   wherein the relay apparatus comprises:
      a second central processing unit executable with program instructions which, when executed, cause the second central processing unit to:
         store a first-address get program specified by the service identification information for getting the first address from the service providing apparatus, wherein the first-address get program uses an API provided in the electronic-file storing service;

upon receiving the request for getting the first address is received from the image processing apparatus, get the first address specified by the service identification information from the service providing apparatus; and transmit, to the image processing apparatus, the first address gotten in response to the request for getting the first address.

2. The image processing system according to claim 1, wherein the first central processing unit of the image processing apparatus is operable for selecting one service of a plurality of electronic-file storing services provided by the service providing apparatus, wherein the first central processing unit transmits a request for getting the first address corresponding to the electronic-file storing service selected to the relay apparatus, wherein the first address represents the location of the electronic file to be downloaded from the service providing apparatus, wherein the second central processing unit stores a plurality of first-address get programs corresponding to the plurality of electronic-file storing services, and wherein the second central processing unit executes the first-address get program corresponding to the electronic-file storing service so as to get the first address from the service providing apparatus.

3. The image processing system according to claim 2, wherein the first central processing unit further is executable with program instructions to further cause the first central processing unit to:

receive the second address from the relay apparatus after the request for getting the second address is transmitted;

transmit, to the service providing apparatus, a thumbnail image request including the second address without the thumbnail image request being relayed by the relay apparatus; and receive the thumbnail image transmitted from the service providing apparatus without the thumbnail image being relayed by the relay apparatus in response to the thumbnail image request.

4. The image processing system according to claim 1, wherein the request for getting the second address includes user identification information.

5. The image processing system comprising of claim 1, wherein the second address represents a location of a thumbnail image of the at least one electronic file.

6. An image processing method used for an image processing system, wherein the image processing system comprises a relay apparatus connected to a network, to which a service providing apparatus for an electronic-file storing service is connected, and an image processing apparatus connected to the network, wherein the image processing apparatus performs steps comprising:

a first-address-get-request transmitting step that transmits, to the relay apparatus, a request for getting a first address representing a location of an electronic file to be downloaded from the service providing apparatus, the request for getting the first address including service identification information;

a first downloading step which, upon receiving the first address from the relay apparatus after the request for getting the first address is transmitted to the relay apparatus, downloads the electronic file stored at the first address from the service providing apparatus without the electronic file being relayed by the relay apparatus;

a storage control step that stores the electronic file downloaded by the first downloading unit in a storage unit, a second-address-get request transmitting step that transmits, to the relay apparatus, a request for getting a second address representing a location where information for specifying at least one electronic file is stored in the service providing apparatus, the request for getting a second address including service identification information;

a second downloading step which, upon receiving the second address from the relay apparatus after the second-address-get-request is transmitted to the relay apparatus, downloads the location information stored at the second address from the service providing apparatus without the location information being relayed by the relay apparatus;

a display step of displaying a selection screen which displays the location information so as to enable the user to select the at least one electronic file to be downloaded on a display unit; and a transmitting step of transmitting, to the relay apparatus, the request for getting the first address of the electronic file selected by operating the operation unit by the user while the selection screen is displayed by the display control unit, and wherein the relay apparatus performs steps comprising:

a first-address-get-program storage step that stores a first-address get program specified by the service identification information for getting the first address from the service providing apparatus, wherein the first-address get program uses an API provided in the electronic-file storing service;

a first-address getting step which, upon receiving the request for getting the first address from the image processing apparatus, gets the first address specified by the service identification information from the service providing apparatus by executing the first-address get program; and a first-address transmitting step that transmits, to the image processing apparatus, the first address got by the first address getting unit.

7. The image processing method of claim 6, wherein the second address represents a location of a thumbnail image of the at least one electronic file.

8. An image processing apparatus that is connected to a network, to which a relay apparatus and a service providing apparatus for an electronic-file storing service are connected, the image processing apparatus comprising:

a central processing unit executable with program instructions which, when executed, cause the central processing unit to:

transmit, to the relay apparatus, a request for getting a first address representing a location of an electronic file to be downloaded from the service providing apparatus, the request for getting the first address including service identification information;

upon receiving the first address from the relay apparatus after the request for getting the first address, specified by the service identification information, is transmitted to the relay apparatus, downloads the electronic file stored at the first address from the service providing apparatus without the electronic file being relayed by the relay apparatus;

store the electronic file in a storage unit;
transmit, to the relay apparatus a request for getting a second address representing a location where information for specifying at least one electronic file is stored in the service providing apparatus, the request for getting a second address including service identification information;
upon receiving the second address from the relay apparatus after the second-address-get-request is transmitted to the relay apparatus, download the location information stored at the second address from the service providing apparatus without the location information stored at the second address being relayed by the relay apparatus;
display a selection screen which displays the location information so as to enable the user to select the at least one electronic file to be downloaded on the display unit; and
transmit, to the relay apparatus, the request for getting the first address of the electronic file selected by operating the operation unit by the user while the selection screen is displayed by the display control unit.

9. The image processing apparatus according to claim 8, wherein the central processing unit is configured to download the electronic file by:
receiving the first address from the relay apparatus after the request for getting the first address is transmitted;
transmitting, to the service providing apparatus, an electronic file request including the first address without the electronic file request being relayed by the relay apparatus; and
receiving an electronic file transmitted from the service providing apparatus without the electronic file being relayed by the relay apparatus in response to the electronic file request transmitted by the electronic-file-request transmitting unit.

10. The image processing apparatus according to claim 8, wherein the central processing unit is further configured to:
print an image; and
control the print unit to print an electronic file stored in the storage unit.

11. The image processing apparatus according to claim 8, wherein the storage unit includes an installable memory medium, and
wherein the central processing unit stores the electronic file in the memory medium.

12. The image processing apparatus of claim 8, wherein the second address represents a location of a thumbnail image of the at least one electronic file.

13. A relay apparatus which is connected to a network, to which a service providing apparatus for an electronic-file storing service and an image processing apparatus are connected, the relay apparatus comprising:
a central processing unit executable with program instructions which, when executed, cause the central processing unit to:
store a second address get program specified by service identification information included in a request for getting a second address representing a location of a thumbnail image of at least one electronic file to be downloaded from the service providing apparatus to the image processing apparatus, wherein the second address get program uses an API provided for using the electronic-file storing service;
upon receiving the request for getting the second address from the image processing apparatus, get the second address specified by the service identification information from the service providing apparatus by executing the second address get program;
transmit, to the image forming apparatus, the second address;
store a first address get program specified by service identification information included in a request for getting a first address representing a location of an electronic file to be downloaded from the service providing apparatus to the image processing apparatus, wherein the first address get program uses an API provided for using the electronic-file storing service;
upon receiving the request for getting the first address from the image processing apparatus, get the first address specified by the service identification information from the service providing apparatus by executing the first address get program; and
transmit, to the image processing apparatus, the first address.

14. A non-transitory computer-readable medium having relay program stored thereon and readable by a computer for controlling a relay apparatus that is connected to a network, to which a service providing apparatus for an electronic-file storing service and an image processing apparatus are connected, said relay program, when executed by the computer, causes the computer to perform operations comprising:
a second-address-get-program storage step that stores a second address get program specified by service identification information included in a request for getting a second address representing a location of a thumbnail image of at least one electronic file to be downloaded from the service providing apparatus to the image processing apparatus, wherein the second address get program uses an API provided for using the electronic-file storing service;
a second address getting step which, upon receiving the request for getting the second address from the image processing apparatus, gets the second address specified by the service identification information from the service providing apparatus by executing the second address get program;
a second address transmitting step that transmits, to the image forming apparatus, the second address got by the second address getting step;
a first address-get-program storage step that stores a first address get program specified by service identification information included in a request for getting a first address representing a location of an electronic file to be downloaded from the service providing apparatus to the image processing apparatus, wherein the first address get program uses an API provided for using the electronic-file storing service;
a first address getting step which, upon receiving the request for getting the first address from the image processing apparatus, gets the first address specified by the service identification information from the service providing apparatus by executing the first address get program; and
a first address transmitting step that transmits, to the image processing apparatus, the first address got by second the address getting step.

* * * * *